United States Patent [19]
Rhee et al.

[11] Patent Number: 5,416,170
[45] Date of Patent: May 16, 1995

[54] CONDUCTIVE POLYMERIC COMPOSITE WITH HIGH ELECTRICAL ACTIVATION DENSITY AND METHOD FOR PREPARING THE SAME

[75] Inventors: Suh B. Rhee; Myong H. Lee; Chang J. Lee; Yong K. Kang, all of Daejun, Rep. of Korea

[73] Assignee: Agency of Defense Development, Daejon, Rep. of Korea

[21] Appl. No.: 66,346

[22] Filed: May 24, 1993

[30] Foreign Application Priority Data

May 27, 1992 [KR] Rep. of Korea ................ 9052/1992

[51] Int. Cl.$^6$ ............................................. C08K 5/08
[52] U.S. Cl. ................................... 524/398; 524/176; 524/396; 524/606; 524/785
[58] Field of Search ............... 524/606, 396, 398, 176, 524/785

[56] References Cited

PUBLICATIONS

Kawai et al (1989) "Electrochemical Characteristics of Poly(vinylferrocene) Derivatives for Battery Applications"*Electrochimica Acta* 34(9):1357–1361.

Breen et al (1991) "An Electrochemical Study of Cation permeability into polypyrrole-containing (Fe(CN$_6$))$^{4-}$" *J. Electroanal. Chem.* 296:445–460.

Shimidzu, T. et al. (1988) "Electrochromism of a Conducting Polypyrrole–Phosphotungstate Composite Electrode" *J. Chem. Soc., Faraday Trans.* 1 84(11): 3941–3949.

Iwakura, C. et al. (1987) "A New Electrode-Active Material for Polymer Batteries" *J. Electrochem Soc.* 134(4):791–795.

*Primary Examiner*—Edward Cain
*Attorney, Agent, or Firm*—Scully, Scott, Murphy & Presser

[57] ABSTRACT

A conductive polymeric composite with an improved electrical activation density obtained by compounding a ferrocene derivative used as a dopant with a polypyrrole of a conductive polymer and a method for preparing the same. The conductive composite can be produced by use of a chemical method or an electrochemical method. In the case of using the chemical method, pyrrole or its derivative is dissolved in a solution containing a ferrocene derivative, together with one or mixture of ferric trichloride, ammonium persulfate and copper chloride-aluminum chloride. In the case of using the electrochemical method, a solution, in which pyrrole or its derivative is dissolved together with ferrocene derivative, is used, as an electrolytic solution, alone or together with a solution in which an electrolyte of inorganic salt such as ammonium salt, lithium perchloric acid and tetraalkylammonium perchloric acid is dissolved. The composite is a superior conductive composite exhibiting an electrochemical activity by virtue of reversible oxidation-reduction reaction of conductive polymer itself and having a high density of electrochemically active material by virtue of an addition of an electrochemical activity obtained by the oxidation-reduction reaction of ferrocene added as an electrolyte.

6 Claims, 2 Drawing Sheets

CONDUCTIVE POLYMERIC COMPOSITE WITH HIGH ELECTRICAL ACTIVATION DENSITY AND METHOD FOR PREPARING THE SAME

BACKGROUND OF THE INVENTION

1. Field of the Invention

The present invention relates to a conductive polymeric composite with a high electrical activation density and a method for preparing the same, and more particularly to a conductive polymeric composite with an increased electrical activation density obtained by compounding a ferrocene derivative having an electrical activity as a dopant with a polypyrrole of a conductive polymer and a method for making the same.

2. Description of the Prior Art

Known conductive polymers include polyacetylene, polypyrrole, polythiophene and etc. Such conductive polymers have not only a conduction property but also electrochemical characteristics such as an electrical discoloration characteristic and an oxidation and reduction characteristic. By virtue of these properties, they are widely used for various applications such as batteries, electrical discoloration display devices, photocells and etc. and the development thereof is being watched with keen interest.

In particular, polypyrrole, polythiophene and polyaniline can be produced by an electrochemical oxidation as well as a chemical polymerization using chemical oxidants and are known as materials exhibiting a high stability at room temperature. There have been issued various research articles and patents concerning these materials.

In spite of exhibiting superior electrical characteristics, nevertheless, these conventional conductive polymeric compounds are poor in workability, mechanical strength and stability. They also have a drawback of a low electrical activity density. As a result, such compounds encounter limitations on practical uses.

For solving the above-mentioned problems, many researches have been made so as to provide conductive polymeric compounds widely applicable to various technical fields. Examples of recently proposed methods are as follows.

As methods for solving the workability of conductive polymers, there have been disclosed a method for producing a conductive polymer by producing and processing a potential compound and heat treating the potential compound (Polymer, 1984, 25, 395), a method for compounding a conductive polymer with other polymeric resins (Polymer Commun., 1982, 23, 795), and a method for producing a composite by using paratoluene sulfonate as an electrolyte so as to enhance strength (IBM J. Res. Dev., 1983, 27, 342).

In particular, many research reports concerning improvements of electrolytic salts have been made, after a report was made about that conductive polymers could have a greatly improved mechanical strength, where an organic salt such as paratoluene sulfonate was used, in place of an inorganic salt such as lithium perchlorate.

However, most electrolytic salts newly proposed have no electrical activity in themselves. Therefore, when the electrolytic salts are compounded with conductive polymers having electrical activity, the density of electrically active material per volume is decreased, so that efficiencies of batteries, electrical discoloration display devices and etc. are degraded.

In particular, where these composites are used as electrode materials of secondary batteries, the electricity accumulation quantity of battery is greatly reduced, because of low density of electrically active material. Accordingly, the present inventors have made this invention capable of maintaining at a high level the density of electrically active material in a conductive polymeric composite obtained, by manufacturing a ferrocene derivative having an electrical activity in the form of an electrolytic salt to be used as a polymeric dopant.

There have been known several methods in which electrochemical active materials are used as electrolytic salts, to obtain conductive polymers. One of these methods is to manufacture polypyrrole or poly 3-methyl thiophene by using polyvalent anions such as $PW_{12}O_{40}^{3-}$, $SiW_{12}O_{40}^{4-}$, and $PMO_{12}O_{40}^{3-}$ obtained from oxides of tungsten and molybdenum. It has been known that in this case, electrochemical activity of polyvalent anions themselves is kept in the composites (E.H.Genies, Synth. Met., 31 327 (1989) and T.Shimaidzu, J. Chem. Soc., Faraday Tran I, 84, 3941 (1988)).

Another method is to manufacture polypyrrole by using Prussian blue $(Fe(CN)_6^{4-}$ as an electrolyte (W.Breen, J. Electroanal. Chem., 297, 445 (1991)).

The electrolytes used in these methods were observed to have electrochemical activity and do stable and reversible oxidation-reduction reaction when they are compounded with conductive polymers. However, the conductive polymeric composites using the inorganic electrolytes in the form of monomers have a drawback that when the oxidation-reduction reaction is continuously carried out, the used electrolytes ace exuded, so that the repeated oxidation-reduction reaction can not be carried out.

This affects fatally the repetitive use life of secondary batteries and thereby makes it difficult to use the polymeric composites for practical purposes. That is, the extruded electrolytes may be a causes of sharply reducing the energy density of secondary battery after the charging and discharging operations of several ten times.

The method for manufacturing secondary batteries by using ferrocenes having electrochemical activity and their derivatives have been recently reported by Yoneyama and Kawai (Yoneyama, J. Electrochem. Soc., 134, 791 (1987) and Kawai, Electrochimica Acta., 34, 1357 (1989)). The Yoneyama's report disclosed that the secondary batteries obtained by using polyvinyl ferrocene have a high energy density of 126.4 mAh/g. The kawai's report disclosed that a secondary battery exhibiting superior charge efficiency and charging and discharging characteristics could be manufactured using polyvinyl ferrocene acetate, polyvinyl ferrocene sulfonate and polydimethyl vinylferrocene.

In cases of manufacturing a secondary battery by using such a ferrocene derivative alone, however, carbon powder of above 50% as a current corrector should be mixed with the ferrocene derivative, since the ferrocene itself has no electrical conductivity. As a result, there is a large loss in total energy density.

SUMMARY OF THE INVENTION

Accordingly, the present inventors thought that the above-mentioned problems might be solved by providing conductive polymeric composites by use of ferrocene derivatives as electrolytes having electrical activity and thus made researches into methods for manufacturing such conductive polymeric composites. As a result of the researches, new conductive polymeric composites could be obtained which exhibited a high density of electrically active materials still maintained even after the repetitive oxidation-reduction reactions.

Therefore, an object of the invention is to provide polypyrrole composites, exhibiting an electrochemical property, produced by using as dopants organic electrolytes having electrochemical activity, in particular, ferrocene derivative salts and a method for manufacturing chemically or electrochemically the polypyrrole composites.

BRIEF DESCRIPTION OF THE DRAWINGS

Other objects and aspects of the invention will become apparent from the following description of embodiments with reference to the accompanying drawings in which.

DETAILED DESCRIPTION OF THE INVENTION

Figure 1:
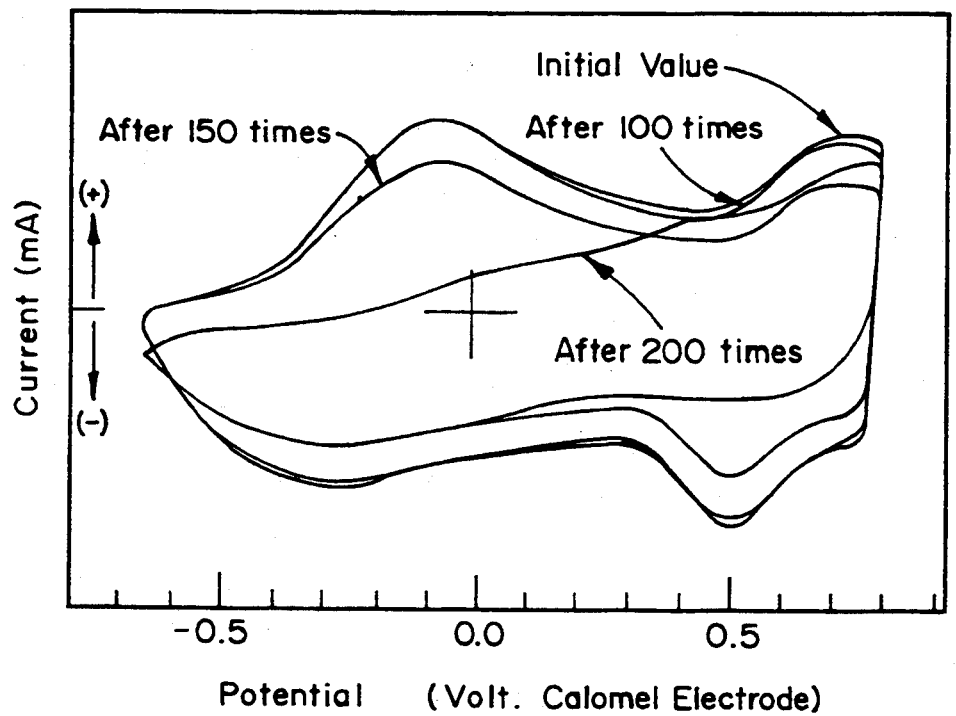
FIG. 1 is curves illustrating a variation in current relative to a repetitive circulating potential, for a composite film obtained by Example 4 of the present invention.

The present invention provides a conductive polymeric composite comprising: (a) a salt of a ferrocene derivative selected from a group consisting of a ferrocene derivative having the formula (I), a polymeric ferrocene derivative having the formula (II) as its repeating unit, and a copolymeric ferrocene derivative having either of the formula (III) or (IV) and the formula (V) as its repeating units; and (b) a polypyrrole or its derivative having the formula (VI), the ratio of the components (a) and (b) being in a range of 1:10 to 10:1;

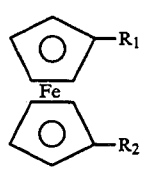
(I)

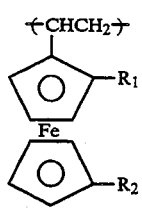
(II)

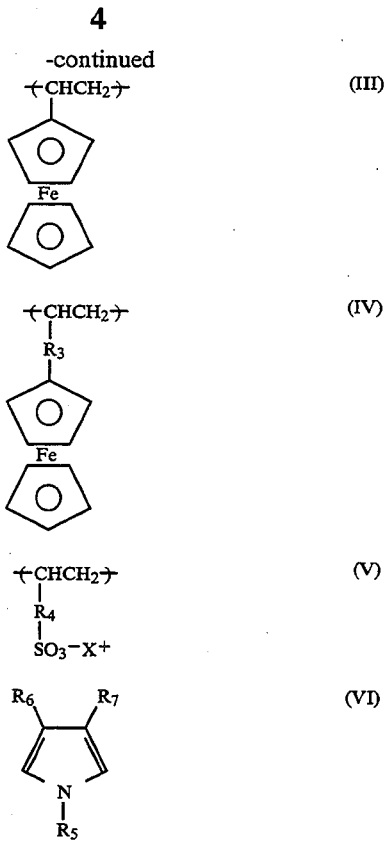

wherein, $R_1$ is H and $R_2$ represents $-SO_3^-X^+$, or both $R_1$ and $R_2$ are $-SO_3^{-X+}$, and $X^+$ represents ammonium alkyl ammonium ions such as tetraethyl ammonium and tetrabutyl ammonium, or alkali metal ions such as lithium, sodium and potassium;

$R_3$ represents $-OCO(CH_2)^{n-}$ or $-CO_2(CH_2)_{n-}$, wherein n is an integer selected from 1 to 8, $R_4$ is

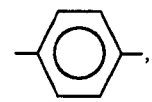

$-CONH-CH(CH_3)-CH_2CH_2-$ or an alkyl derivative, and $X^+$ is ammonium, alkyl ammonium ions such as tetraethyl ammonium and tetrabutyl ammonium, or alkali metal ions such as lithium, sodium and potassium; and $R_5$, $R_6$ and are independently $-H$, $-CH_3$, $-CH_2CH_3$, $-CH_2CH_2CH_3$, $-C(CH_3)_3$, or $-C_6H_5$: and a method for preparing the same.

Ferrocene derivative may be obtained by utilizing conventional methods. In the case of the formula (I), ferrocene is reacted with sulfuric acid to produce ferrocene sulfonic acid or ferrocene disulfonic acid which is, in turn, reacted with a basic material such as sodium hydroxide, aqueous ammonia and tetrabutyl ammonium hydroxide. In this manner, various ferrocene sulfonate may be produced. In the case of the formula (II), polyvinyl ferrocene obtained by a polymerization of vinyl ferrocene is reacted with sulfuric acid to produce polyvinyl ferrocene sulfonic acid which is, in turn, reacted with a basic material such as sodium hydroxide, aqueous ammonia and tetrabutyl ammonium hydroxide. In this manner, various polyvinyl ferrocene sulfonate may be produced.

In the case of the copolymeric ferrocene derivative salt having either of the formula (III) or (IV) and the formula (V) as its repeating units, it is obtained by copolymerizing vinyl ferrocene, ferrocenyl acrylate, or ferrocenyl vinylacetate with vinylstyrene sulfonic acid, its salt, acrylamidopropyl sulfonic acid and its salt, at a ratio of 1:10 to 2:3, and then reacting the resulting copolymer with a basic material such as sodium hydroxide, aqueous ammonia and tetrabutyl ammoniumhydroxide.

In accordance with the present invention, the conductive composite can be produced by use of a chemical method or an electrochemical method. Now, these methods will be described.

In the case of using the chemical method, pyrrole or its derivative is dissolved in a solution, in which a ferrocene derivative obtained in the above-mentioned manner is dissolved, together with compound selected from ferric trichloride, ammonium persulfate and cuprous chloride-aluminum chloride or mixture thereof. In the solution, they are polymerized together by a chemical oxidation reaction, thereby producing a conductive polymeric composite.

In the case of using the electrochemical method, a solution, in which pyrrole or its derivative is dissolved together with the ferrocene derivative obtained in the above-mentioned manner, is used, as an electrolytic solution, alone or together with a solution in which an electrolyte of inorganic salt such as lithium perchloric acid tetraalkyl ammonium perchloric acid and etc. is dissolved. Pyrrole monomer in the electrolytic solution is oxidized according to a method using a work electrode, so as to produce a conductive polymeric composite (the method will be described hereinafter as the first method).

As an electrochemical device used in this case, a typical 2-electrode reactor or a typical 3-electrode reactor may be used. The reactor may comprise a work electrode as a cathode and an opposite electrode as an anode or a standard electrode such as Standard Calomel Electrode together with the two electrodes.

For applying a voltage to the work electrode, various methods may be used, which includes a method for maintaining the voltage at a certain level (this method will be described hereinafter as the second method), a method for maintaining current at a certain level (this method will be described hereinafter as the third method), and a method for circulating an electric potential within a certain voltage range (this method will be described hereinafter as the fourth method).

Now, the present invention will be described in detail.

The first method

Ferrocene derivative is dissolved, together with pyrrole or its derivative, in an organic solvent such as chloroform or water at a proper ratio. The mixture is slowly added with ferric trichloride while being stirred, at room temperature, wherein the ferric trichloride may be added as it is or it may be dissolved in the same solvent as aforementioned before the addition. The resulting mixture is then stirred in room temperature for about 10 minutes, so that a polymer material with a black color is produced. This polymer material is separated from the mixture using a filter. The separated polymer material is washed using acetonitrile and water and then dried in a vacuum.

The second Method

Ferrocene derivative is dissolved, together with pyrrole or its derivative, in water, or an organic solvent such as acetonitrile, or a mixture thereof, at a proper ratio. The resulting mixture may be directly used as an electrolytic solution. Alternatively, it is added with an electrolyte such as ammonium salt, lithium perchloric acid, or tetraalkyl ammonium salt, to be used as an electrolytic solution. Thereafter, a working electrode and an opposite electrode are positioned in parallel to each other in the electrolytic solution and a potential of 0.5 to 1.5 V relative to a Standard Calomel Electrode is applied to the working electrode so as to perform a polymerization reaction. By the polymerization reaction, a polymeric composite film is produced on the working electrode.

The third Method

This method is similar to the first method, except that the Standard Calomel Electrode is not used. In accordance with this method, a polymerization reaction is carried out while the working electrode is maintained at a current density between 0.1 to mA/cm$^2$. By the polymerization reaction, a polymeric composite film is produced on the working electrode.

The fourth Method

This method is similar to the second method, except that a voltage circulating between the minimum value of $-0.7$ to 0.5 V and the maximum value of 0.5 to 1.5 V is applied to the working electrode during the oxidative polymerization reaction, as compared with the second method wherein a constant voltage is applied to the working electrode. By the polymerization reaction, a polymeric composite film is deposited on the working electrode.

For evaluating the above-mentioned methods in which ferrocene derivative is compounded with polypyrrole or its derivative, to produce the conductive polymeric composite, in accordance with the present invention, a variation in the anode current relative to the circulating potential of $-0.3$ to 0.8 V was repeatedly carried out at a rate of 100 mV/sec, as shown in FIG. 1. Even after variations of over 200 times, it was hardly exhibited a reduction in current amount. Accordingly, it could be found that no polymeric composite was exuded in the solution during the repeated oxidation and reduction reactions.

The conductive polymeric composites exhibited the conductivity of about 0.001 to 1 S/cm, according to a measurement by the 4-needle process. Of course, the conductivity may be varied, depending upon the manufacture condition and the structure of ferrocene derivative used.

The composite of ferrocene derivative and polypyrrole according to the present invention is a superior conductive composite exhibiting an electrochemical activity by virtue of reversible oxidation-reduction reaction of conductive polymer itself and having a high density of electrochemically active material by virtue of an addition of an electrochemical activity obtained by the oxidation-reduction reaction of ferrocene added as an electrolyte. It is also a material usable as active electrodes of secondary batteries and electrical discoloration display devices utilizing electrochemical characteristics of conductive polymers, in that it exhibits a stability against an exudation during repeated oxidation-reduction reactions.

The present invention will be understood more readily with reference to the following examples; however these examples are intended to illustrate the invention and are not to be construed to limit the scope of the present invention.

EXAMPLE 1

0.05 mole pyrrole and 0.05 mole tetraethylammonium ferrocene sulfonate were dissolved in 10 ml chloroform, The mixture was then added with a solution obtained by dissolving ferric trichloride in dichloromethane, while being stirred at room temperature. After stirring for about 3 hours, black solid was deposited. The solid powder was separated from the mixture according to a filtration, repeatedly washed using water and methanol, and then dried in a vacuum.

The obtained black powder was then compacted to form a disc with a diameter of 13 mm, which was, in turn, subjected to the 4-needle process so as to measure its conductivity. As a result, the disc exhibited the conductivity of $10^{-2}$ S/cm.

EXAMPLE 2

0.05 mole pyrrole e and 0.05 mole tetraethylammonium salt of ferrocene disulfonate were dissolved in 10 ml chloroform. The mixture was then added with a solution obtained by dissolving ferric trichloride in dichloromethane, while being stirred at room temperature. After stirring for about 3 hours, black solid was deposited. The solid powder was separated from the mixture according to a filtration, repeatedly washed using water and methanol, and then dried in a vacuum.

The obtained black powder was then compacted and subjected to the 4-needle process so as to measure its conductivity. As a result, it exhibited the conductivity of $10^{-2}$ S/cm.

EXAMPLE 3

0.05 mole pyrrole and 0.05 mole tetraethylammonium salt of polyvinylferrocene sulfonate were dissolved in 10 ml chloroform. From the mixture, a conductive polymer composite was produced in the same manner as Example 1.

The obtained conductive composite was subjected to the 4 needle process so as to measure its conductivity. As a result, it exhibited the conductivity of $10^{-2}$ S/cm.

EXAMPLE 4

0.05 mole pyrrole and 0.05 mole ammonium salt of ferrocene disulfonate were dissolved in a distilled water so as to obtain an electrolytic solution. The electrolytic solution was then contained in a typical 3-electrode electrochemical bath. Using a platinum plate of $2 cm \times 5 cm$ as a working electrode, thereafter, current is supplied to the bath under the condition that a potential of 1.0 V relative to a Standard Calomel Electrode was applied to the working electrode so as to perform a polymerization reaction. By the polymerization reaction, a black polypyrrole composite film was deposited on the working electrode.

After two hours has elapsed, supplying of electric power was shut off and the composite film deposited on the working electrode was washed by water and acetonitrile.

The obtained black composite film was then released from the cathode and then subjected to the 4-needle process so as to measure its conductivity. As a result, the film exhibited the conductivity of 0.11 S/cm.

EXAMPLE 5

0.05 mole pyrrole and 0.05 mole ammonium salt of ferrocene sulfonate were dissolved in a distilled water so as to obtain an electrolytic solution. From the electrolytic solution, a conductive polymer composite film was produced in the same manner as Example 4.

The obtained composite film was then released from the working electrode and then subjected to the 4-needle process so as to measure its conductivity. As a result, the film exhibited the conductivity of 0.15 S/cm.

EXAMPLE 6

0.05 mole pyrrole and 0.05 mole ammonium salt of polyvinylferrocene sulfonate were dissolved in a distilled water so as to obtain an electrolytic solution. From the electrolytic solution, a conductive polymer composite film was produced in the same manner as Example 4.

The obtained composite film was then released from the working electrode and then subjected to the 4-needle process so as to measure is conductivity. As a result, the film exhibited the conductivity of 0.20 S/cm.

EXAMPLE 7

0.05 mole pyrrole and 0.2 mole ammonium salt of a copolymer of vinylferrocene and styrene sulfonate at the ratio of 1:3 were dissolved in a distilled water so as to obtain an electrolytic solution. From the electrolytic solution, a conductive polymer composite film was produced in the same manner as Example 4.

The obtained composite film was then released from the working electrode and then subjected to the 4-needle process so as to measure its conductivity. As a result, the film exhibited the conductivity of 0.15 S/cm.

EXAMPLE 8

In this example, the same electrolytic solution and bath as Example 4 were used. Current was then supplied to the bath under the condition that a potential circulating between $-0.3$ V and 0.8 V at a rate of 50 mV/sec was applied to the working electrode, so as to perform a polymerization reaction. By the polymerization reaction, a black composite film was deposited on the working electrode. After the potential variations of about 300 times, supplying of electric power was shut off and the composite film deposited on the working electrode was washed by water and acetonitrile. The composite film was dried in a vacuum.

The obtained black composite film was then released from the working electrode and then subjected to the 4-needle process so as to measure its conductivity. As a result, the film exhibited the conductivity of 0.92 S/cm.

EXAMPLE 9

Using the same electrolytic solution as Example 5, a conductive polymeric composite was produced in the same manner as Example 8.

The obtained black composite film was then released from the working electrode and then subjected to the 4-needle process so as to measure its conductivity. As a result, the film exhibited the conductivity of 0.31 S/cm.

EXAMPLE 10

Using the same electrolytic solution as Example 6, a conductive polymeric composite was produced in the same manner as Example 8.

The obtained black composite film was then released from the working electrode and then subjected to the 4-needle process so as to measure its conductivity. As a result, the film exhibited the conductivity of 0.27 S/cm.

EXAMPLE 11

In this example, the same electrolytic solution and bath as Example 4 were used. Current was then supplied to the bath under the condition that a current density of 0.2 A/cm² was maintained between the working electrode and the opposite electrode, so as to perform a polymerization reaction. By the polymerization reaction, a black conductive polymeric composite film was deposited on the working electrode. After 30 minutes has elapsed, supplying of electric power was shut off and the composite film deposited on the working electrode was cleaned by water and acetonitrile.

The obtained black composite film was then released from the working electrode and then subjected to the 4-needle process so as to measure its conductivity. As a result, the film exhibited the conductivity of 0.29 S/cm.

EXAMPLE 12

Using the same electrolytic solution as Example 5, a conductive polymeric composite was produced in the same manner as Example 11.

The obtained black composite film was then released from the working electrode and then subjected to the 4-needle process so as to measure its conductivity. As a result, the film exhibited the conductivity of 0.16 S/cm.

EXAMPLE 13

Using the same electrolytic solution as Example 6, a conductive polymeric composite was produced in the same manner as Example 11.

The obtained black composite film was then released from the working electrode and then subjected to the 4-needle process so as to measure its conductivity. As a result, the film exhibited the conductivity of 0.32 S/cm.

Comparative Example 1

Polypyrrole doped with perchloric acid was produced using a typical electrochemical process.

For comparing properties of this polypyrrole with properties of polypyrroles obtained by Examples 8 and 10, each of the polypyrroles or their derivatives was coated over the working electrode of the typical 3-electrode electrochemical bath and then dipped in an acetonitrile solution containing 0.1M of lithium perchloric acid. Thereafter, potential between the standard electrode and the working electrode was circulated in a range of −0.7 V to 1.0 V at a constant rate of 100 mV/sec and the current amount flowing between the working electrode and the opposite was measured using the cyclovoltammetry method. The measured characteristics of the polypyrroles and their composites were shown in FIG. 2.

Figure 2:
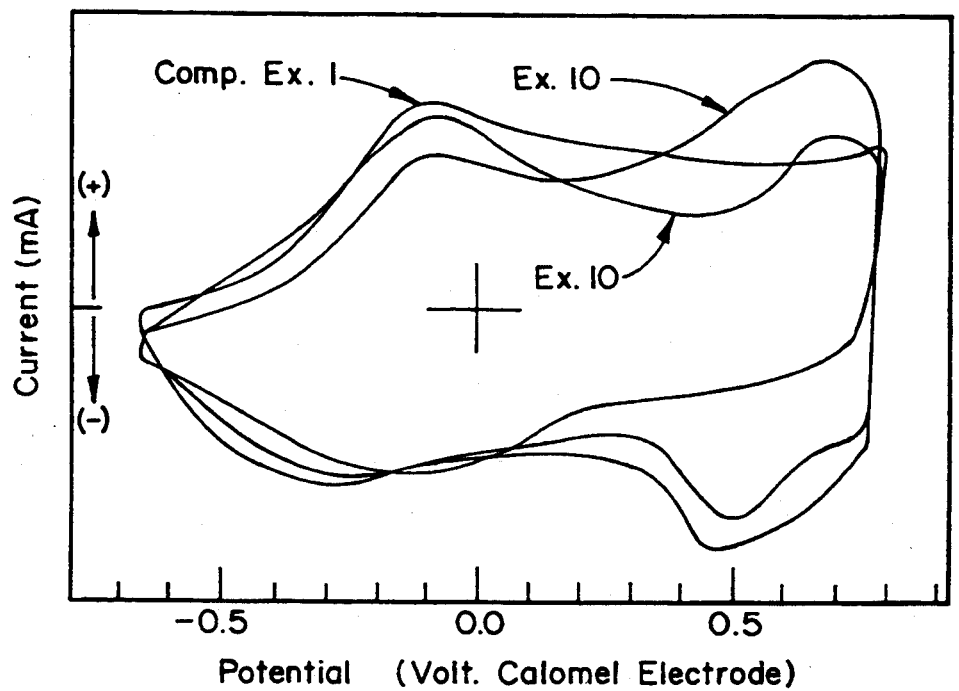
FIG. 2 is curves illustrating variations in current in electrolytic solutions, for composite films obtained by methods of Examples 8 and 10 and a pure polypyrrole obtained by Comparative Example 1 according to a typical electrical composition method.

As shown in FIG. 2, an oxidation current curve of polypyrrole observed between −0.3 V to +0.3 V and oxidation current curves of ferrocene or its derivative observed between 0.7 V to 1.0 V were obtained. From these curves, it could be found that the ferrocene or its derivative performed reversible oxidation and reduction, irrespective of polypyrrole or its derivative.

Figure 3:
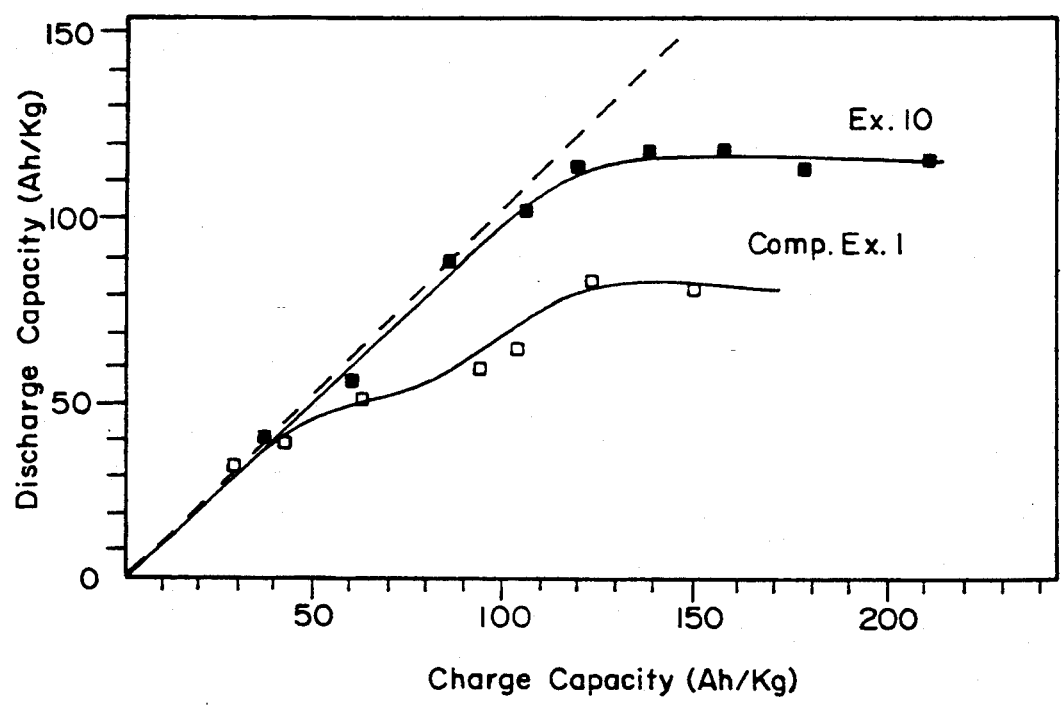
FIG. 3 is curves illustrating maximum output capacities of half cell made from a composite obtained by Example 10 and a pure polypyrrole obtained by Comparative Example 1.

FIG. 3 shows a comparison of a maximum output capacity measured by charge and discharge test relative to a standard electrode, with the polypyrrole obtained by Comparative Example 1 according to the typical conventional method. The maximum output capacity was 118 Ah/kg and the average discharge voltage relative to Standard Calomel Electrode was 0.282 V. When they were calculated relative to the lithium electrode, the energy density was 425 Ah/Kg and the average discharge voltage was 3.6 V.

As apparent from the above description, the conductive polymeric composite manufactured by the present invention has a reversible and stable oxidation-reduction characteristic obtained by polypyrrole or its derivative. In the conductive polymeric composite, ferrocene or its derivative added as a dopant is maintained at a stable coupling condition. The ferrocene or in a derivative also exhibits a reversible oxidation-reduction characteristic. As a result, where the conductive polymeric composite is used for secondary batteries, the density of electrically active material is greatly improved. Also, high energy density and discharge voltage are exhibited. Where the conductive polymeric composite is used as electrodes of electrical discoloration devices, various and stable discoloration characteristic is exhibited. Accordingly, the conductive polymeric composite is a material widely usable for various applications.

What is claimed is:

1. A conductive polymeric composite with an electrical activation density comprising:

(a) a salt of a ferrocene derivative selected from a group consisting of a ferrocene derivative having the formula (I), a polymeric ferrocene derivative having the formula (II) as its repeating unit, and a copolymeric ferrocene derivative having either of the formula (III) or (IV) and the formula (V) as its repeating units; and (b) a polypyrrole or its derivative having the formula (VI), the ratio of the components (a) and (b) being in a range of 1:10 to 10:1;

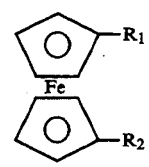

(I)

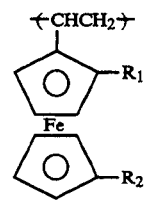

(II)

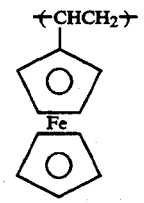

(III)

-continued

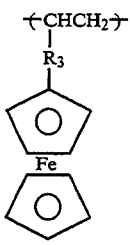 (IV)

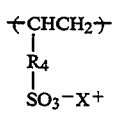 (V)

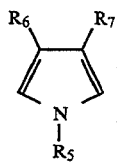 (VI)

wherein, $R_1$ is H and $R_2$ represents $-SO_3^-X^+$, or both $R_1$ and $R_2$ are $-SO_3^-X^+$, represents ammonium, alkyl ammonium ions such as tetraethyl ammonium and tetrabutyl ammonium, or alkali metal ions such as lithium, sodium and potassium;

$R_3$ represents $-OCO(CH_2)_n-$ or $-CO_2(CH_2)_n-$, wherein n is an integer selected from 1 to 8, $R_4$ is

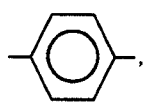

$-CONH-CH(CH_3)-CH_2CH_2-$ or an alkyl derivative, and $X^+$ is ammonium, alkyl ammonium ions such as tetraethyl ammonium and tetrabutyl ammonium, or alkali metal ions such as lithium, sodium and potassium; and $R_5$, $R_6$ and $R_7$ are independently $-H$, $-CH_3$, $-CH_2CH_3$, $-CH_2CH_2CH_3$, $-C(CH_3)_3$, $-CH(CH_3)_2$, or $-C_6H_5$.

2. A method for preparing a conductive polymeric composite with an electrical activation density comprising the steps of:

dissolving, in a solvent, 0.01 to 1 mole of a salt of a ferrocene derivative selected from a group consisting of a ferrocene derivative having the formula (I), a polymeric ferrocene derivative having the formula (II) as its repeating unit, and a copolymeric ferrocene derivative having either of the formula (III) or (IV) and the formula (V) as its repeating units, together with 0.01 to 1 mole of an oxidant; and polymerizing the resulting solution with a monomeric pyrrole or its derivative so as to produce a conductive polymeric composite containing the ferrocene derivative salt and a polypyrrole or its derivative of the formula (VI) at a ratio of 1:10 to 10:1;

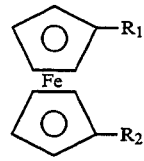 (I)

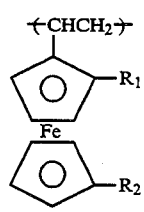 (II)

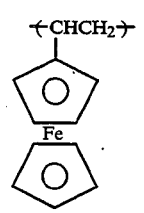 (III)

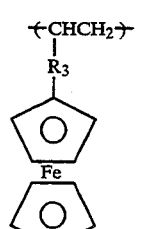 (IV)

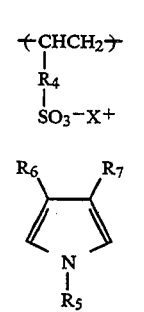 (V)

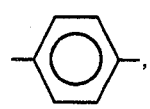 (VI)

wherein, $R_1$ is H and represents $-SO_3^-X^+$, or both $R_1$ and $R_2$ are $-SO_3^-X^+$, and $X^+$ represents ammonium, alkyl ammonium ions such as tetraethyl ammonium and tetrabutyl ammonium, or alkali metal ions such as lithium, sodium and potassium;

$R_3$ represents $-OCO(CH_2)_n-$ or $-CO_2(CH_2)_n-$, wherein n is an integer selected from 1 to 8, $R_4$ is

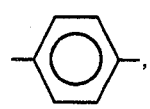

$-CONH-CH(CH_3)-CH_2CH_2-$ or an alkyl derivative, and $X^+$ is ammonium, alkyl ammonium ions such as tetraethyl ammonium and tetrabutyl ammonium, or alkali metal ions such as lithium, sodium and patassium; and $R_5$, $R_6$ and $R_7$ are independently —H, —CH$_3$, —CH$_2$CH$_3$, —CH$_2$ CH$_2$CH$_3$, —C(CH$_3$)$_3$, —CH(CH$_3$)$_2$, or —C$_6$H$_5$.

3. A method in accordance with claim 2, wherein the polymerization step comprises the steps of mixing 0.01 to 1 mole of the monomeric pyrrole or its derivative in the solution containing the ferrocene derivative salt, reacting the monomeric pyrrole or its derivative with the ferrocene derivative salt at a temperature of 0° to 60° C. 5 to 48 hours while the resulting mixture being stirred, and then drying a product obtained by the reaction in a vacuum.

4. A method for preparing a conductive polymeric composite with an electrical activation density comprising the steps of:
preparing, as an electrolytic solution, a solution containing 0.01 to 1 mole of a salt of a ferrocene derivative selected from a group consisting of a ferrocene derivative having the formula (I), a polymeric ferrocene derivative having the formula (II) as its repeating unit, and a copolymeric ferrocene derivative having either of the formula (III) or (IV) and the formula (V) as its repeating units, together with 0.01 to 1 mole a monomeric pyrrole or its derivative, or a solution containing 0.01 to 1 mole an inorganic electrolyte selected from a group consisting of ammonium salt, lithium perchloric acid, or tetraalkyl ammonium salt, in addition to the ferrocene derivative salt and the monomeric pyrrole or i derivative; and
performing a polymerization reaction in the electrolytic solution by positioning a working electrode and an opposite electrode in parallel to each other in the electrolytic solution and applying to the working electrode a potential of 0.5 to 1.5 V relative to a Standard Calomel Electrode, so as to produce a conductive polymeric composite containing the ferrocene derivative salt and a polypyrrole or its derivative of the formula (VI) at a ratio of 1:10 to 10:1;

(I)
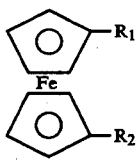

(II)
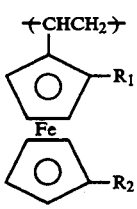

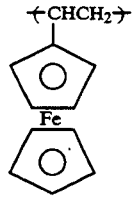(III)

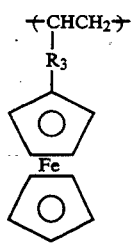(IV)

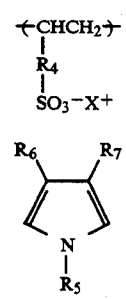(V)

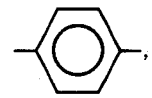(VI)

wherein, $R_1$ is H and $R_2$ represents —SO$_3$$^-$X$^+$, or both $R_1$ and $R_2$ are —SO$_3$$^-$X$^+$, and X$^+$ represents ammonium, alkyl ammonium ions such as tetraethyl ammonium and tetrabutyl ammonium, or alkali metal ions such as lithium, sodium and potassium;

$R_3$ represents —OCO(CH$_2$)$_n$— or —CO$_2$(CH$_2$)$_n$—, wherein n is an integer selected from 1 to 8, $R_4$ is

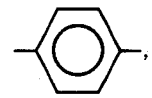,

—CONH—CH(CH$_3$)—CH$_2$CH$_2$— or an alkyl derivative, and X$^+$ is ammonium, alkyl ammonium ions such as tetraethyl ammonium and tetrabutyl ammonium, or alkali metal ions such as lithium, sodium and potassium; and $R_5$, $R_6$ and $R_7$ are independently —H, —CH$_3$, —CH$_2$CH$_3$, —CH$_2$CH$_2$CH$_3$, —C(CH$_3$)$_3$, —CH(CH$_3$)$_2$, or —C$_6$H$_5$.

5. A method in accordance with claim 2, wherein the polymerization reaction is carried out by applying to the working electrode a voltage circulating between —0.5 and 1.5 V at a constant rate of 10 to 200 mV/sec.

6. A method in accordance with claim 2, wherein the polymerization reaction is carried out by applying to the working electrode a current with a current density of 0.01 to 1 A/cm$^2$ for 0.1 to 4 hours.

* * * * *

UNITED STATES PATENT AND TRADEMARK OFFICE
CERTIFICATE OF CORRECTION

PATENT NO. : 5,416,170
DATED : May 16, 1995
INVENTOR(S) : Shu Bong Rhee

It is certified that error appears in the above-indentified patent and that said Letters Patent is hereby corrected as shown below:

On the Title Page, Section [56], Column 2: insert the following on line 3:

--Edwards, J.H. and W.J. Frost (1984) "New routes to conjugated polymers: 1.A two step route to polyacetylene" Polymer 25 (March):395-398.

Galvin, M.E. and G.E. Wnek (1982) "Electrically conductive polymer composited: Polymerization of acetylene in polyethylene" Polymer 23 (June):795-797.

Diaz, A.F. and B. Hall (1983) "Mechanical Properties of Electrochemically Prepared Polypyrrole Films" IBM J. Res. Develop. 27(July):342-347

Bidan, G. et al. (1989) "One-step Electrochemical Immobilization of Keggin-Type Heteroplyanions in Poly(3-Methylthiophene) Film at an Electrode Surface: Electrochemical and Electrocatalytic Properties" Synthetic Metals 31:327-334.--

Column 2, line 16: " $PMO_{12}P_{40}^{3-}$ " should read -- $PMo_{12}P_{40}^{3-}$ --

UNITED STATES PATENT AND TRADEMARK OFFICE
CERTIFICATE OF CORRECTION

Page 2 of 4

PATENT NO. : 5,416,170
DATED : May 16, 1996
INVENTOR(S) : Shu Bong Rhee

It is certified that error appears in the above-indentified patent and that said Letters Patent is hereby corrected as shown below:

Column 2, line 20: "E.H." should read --E.M.--

Column 2, line 24: " $(Fe(CN)_6^{4-}$ " should read -- $(Fe(CN)_6^{4-})$ --

Column 2, line 33: "ace" should read --are--

Column 4, line 46: " $X^+is$ " should read -- $X^+$ is --

Column 4, line 52: before "or" insert -- $-CH(CH_3)_2$, --

Column 5, line 27: after "with" delete --the--

Column 7, line 6: after "chloroform," should read --chloroform.--

Column 7, line 16: after "mm" delete --,--

Column 11, line 26, Claim 1: before "represents" delete --,-- and insert -- and $X^+$ --

UNITED STATES PATENT AND TRADEMARK OFFICE
CERTIFICATE OF CORRECTION

PATENT NO. : 5,416,170
DATED : May 16, 1995
INVENTOR(S) : Shu Bong Rhee

It is certified that error appears in the above-indentified patent and that said Letters Patent is hereby corrected as shown below:

Column 11, line 31, Claim 1: "$R_3$represents" should read --$R_3$ represents--

Column 11, line 66, Claim 2: "1: 10" should read --1:10--

Column 12, line 50, Claim 2: after "and" insert --$R_2$--

Column 13, line 11, Claim 3: "C. 5" should read --C. for 5--

Column 13, line 33, Claim 4: delete --i-- and before "derivative;" insert --its--

Column 14, line 33, Claim 4: " $X^+$represents" should read -- $X^+$ represents --

UNITED STATES PATENT AND TRADEMARK OFFICE
CERTIFICATE OF CORRECTION

PATENT NO. : 5,416,170
DATED : May 16, 1995
INVENTOR(S) : Shu Bong Rhee

It is certified that error appears in the above-indentified patent and that said Letters Patent is hereby corrected as shown below:

Column 14, line 48, Claim 4: " $X^{+}is$ " should read -- $X^{+}$ is --

Signed and Sealed this

Third Day of June, 1997

Attest:

BRUCE LEHMAN

*Attesting Officer*     *Commissioner of Patents and Trademarks*